United States Patent
Lee

(10) Patent No.: US 9,902,426 B2
(45) Date of Patent: Feb. 27, 2018

(54) APPARATUS AND METHOD FOR DRIVER ASSISTANCE

(71) Applicant: Hyundai Mobis Co., Ltd., Seoul (KR)

(72) Inventor: Seong soo Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 99 days.

(21) Appl. No.: 14/884,121

(22) Filed: Oct. 15, 2015

(65) Prior Publication Data

US 2016/0107689 A1 Apr. 21, 2016

(30) Foreign Application Priority Data

Oct. 17, 2014 (KR) .................. 10-2014-0141126
Oct. 30, 2014 (KR) .................. 10-2014-0149632

(51) Int. Cl.
| | |
|---|---|
| *G06K 9/00* | (2006.01) |
| *B62D 15/02* | (2006.01) |
| *G06K 9/46* | (2006.01) |
| *G06T 11/60* | (2006.01) |
| *B60R 1/00* | (2006.01) |

(52) U.S. Cl.
CPC .......... *B62D 15/0275* (2013.01); *B60R 1/00* (2013.01); *B62D 15/025* (2013.01); *B62D 15/027* (2013.01); *B62D 15/0285* (2013.01); *G06K 9/00798* (2013.01); *G06K 9/4671* (2013.01); *G06T 11/60* (2013.01); *B60R 2300/105* (2013.01); *B60R 2300/303* (2013.01); *B60R 2300/607* (2013.01); *B60R 2300/806* (2013.01); *G06T 2207/10004* (2013.01); *G06T 2207/20221* (2013.01); *G06T 2207/30256* (2013.01)

(58) Field of Classification Search
None
See application file for complete search history.

(56) References Cited

U.S. PATENT DOCUMENTS

| | | | |
|---|---|---|---|
| 2006/0015252 A1* | 1/2006 | Yamamoto | G06K 9/00798 701/301 |
| 2008/0055114 A1 | 3/2008 | Kim et al. | |

(Continued)

FOREIGN PATENT DOCUMENTS

| | | |
|---|---|---|
| CN | 101101333 | 1/2008 |
| CN | 202806557 | 3/2013 |

(Continued)

OTHER PUBLICATIONS

BMW Driver Assistance—BMW Canada, Jun. 4, 2013 (google Search).*

(Continued)

*Primary Examiner* — Randolph I Chu
(74) *Attorney, Agent, or Firm* — H.C. Park & Associates, PLC

(57) ABSTRACT

A driver assisting apparatus including a top view image output unit that outputs a top view image at a view point at which a surrounding of the vehicle is downwardly watched from a top, a lane detecting unit that detects a left lane boundary of the vehicle and a right lane boundary of the vehicle from the top view image using a top hat filter, a speed measuring unit that outputs a speed of the vehicle, and an integrated control unit that selects and operates one of a parking assisting function and a lane departure warning function in accordance with the speed.

18 Claims, 9 Drawing Sheets

(56) References Cited

U.S. PATENT DOCUMENTS

| | | | | |
|---|---|---|---|---|
| 2012/0062743 A1* | 3/2012 | Lynam | .................... | B60Q 9/005 348/148 |
| 2012/0062745 A1* | 3/2012 | Han | .................... | B62D 15/029 348/148 |
| 2012/0154588 A1* | 6/2012 | Kim | .................... | G06K 9/4633 348/148 |
| 2012/0162427 A1* | 6/2012 | Lynam | .................... | B60R 1/00 348/148 |
| 2013/0314503 A1* | 11/2013 | Nix | .................... | G06K 9/00805 348/46 |
| 2014/0192195 A1* | 7/2014 | Su | .................... | G08G 1/167 348/148 |
| 2014/0307083 A1* | 10/2014 | Oh | .................... | B60R 1/00 348/118 |
| 2014/0333455 A1* | 11/2014 | Lee | .................... | B62D 15/028 340/932.2 |
| 2015/0069829 A1* | 3/2015 | Dulle | .................... | B60R 16/03 307/9.1 |
| 2015/0130640 A1* | 5/2015 | Ryu | .................... | G06K 9/00812 340/932.2 |
| 2016/0034768 A1* | 2/2016 | Lee | .................... | B60R 1/00 348/38 |
| 2016/0307050 A1* | 10/2016 | Das | .................... | G06K 9/6218 |
| 2016/0325682 A1* | 11/2016 | Gupta | .................... | B60R 1/00 |
| 2017/0017848 A1* | 1/2017 | Gupta | .................... | B60W 30/06 |
| 2017/0054974 A1* | 2/2017 | Pliefke | .................... | H04N 17/002 |
| 2017/0225619 A1* | 8/2017 | Torii | .................... | B60R 1/00 |

FOREIGN PATENT DOCUMENTS

| | | |
|---|---|---|
| CN | 103192828 | 7/2013 |
| CN | 104036279 | 9/2014 |

OTHER PUBLICATIONS

Kozak et al. ("Evaluation of Lane Depature warning for Drowsy Drivers", Proceeding of the Human Factors and Ergonomics Socity 50th annual Meeting 2006).*

* cited by examiner

APPARATUS AND METHOD FOR DRIVER ASSISTANCE

CROSS-REFERENCE TO RELATED APPLICATION

This application claims priority from and the benefit of Korean Patent Application No. 10-2014-0141126, filed on Oct. 17, 2014, and Korean Patent Application No. 10-2014-0149632, filed on Oct. 30, 2014, which are hereby incorporated by reference for all purposes as if fully set forth herein.

BACKGROUND

Field

Exemplary embodiments relate to a driver assisting apparatus and a driver assisting method. More particularly, exemplary embodiments relate to a driver assisting apparatus and a driver assisting method which detect a lane boundary near a vehicle and perform one of parking assistance and lane departure warning in accordance with a speed of the vehicle.

Discussion of the Background

Recently, for safety of a driver and a pedestrian, a smart parking assist system (SPAS) and a lane departure warning system (LDWS) have been applied to vehicles. In the SPAS and the LDWS, a technique of detecting a lane is adopted. However, both systems use separate lane boundary detecting algorithms creating inefficiencies.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments unify a lane boundary detecting algorithm that is applied to a parking assistance system and a lane departure warning system to remove inefficiency of the system. Exemplary embodiments improve a lane boundary detecting accuracy and automatically operate the parking assistance system or the lane departure warning system in accordance with the speed of the vehicle to increase convenience for a user.

Additional aspects will be set forth in the detailed description which follows, and, in part, will be apparent from the disclosure, or may be learned by practice of the inventive concept.

An exemplary embodiment discloses a driver assisting apparatus including a top view image output unit that outputs a top view image at a view point at which a surrounding of the vehicle is downwardly watched from a top, a lane boundary detecting unit that detects a left lane boundary of the vehicle and a right lane boundary of the vehicle from the top view image using a top hat filter, a speed measuring unit that outputs a speed of the vehicle, and an integrated control unit that selects and operates one of a parking assisting function and a lane departure warning function in accordance with the speed.

An exemplary embodiment discloses a driver assisting method including capturing images at a surrounding of the vehicle to output a top view image, converting the top view image into a grayscale image, detecting a left lane boundary and a right lane boundary of the vehicle from the grayscale image using a top hat filter, detecting an interval between the left lane boundary and the right lane boundary to determine an effectiveness of the detected lane, measuring a speed of the vehicle, and selecting and operating one of a parking assisting function and a lane departure warning function in accordance with the measured speed.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
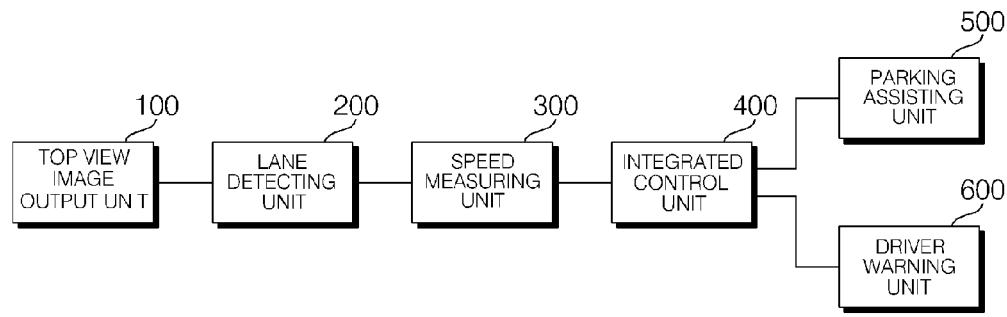
FIG. 1 is a diagram illustrating a configuration of a driver assisting apparatus according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a diagram illustrating a configuration of a driver assisting apparatus according to an exemplary embodiment. A driver assisting apparatus according to an exemplary embodiment includes a top view image output unit 100, a lane detecting unit 200, a speed measuring unit 300, and an integrated control unit 400.

Specifically, the driver assisting apparatus according to an exemplary embodiment includes the top view image output unit 100 that outputs a top view image at a view point at which a surrounding of the vehicle is watched from the top to the bottom, the lane detecting unit 200 that detects a left lane boundary of the vehicle and a right lane boundary of the vehicle from the top view image using a top hat filter, a speed measuring unit 300 that outputs a speed of the vehicle, and the integrated control unit 400 that selectively operates one of a parking assisting function and a lane departure warning function in accordance with the speed.

The top view image is an image at a view point at which the surrounding of the vehicle is downwardly watched from the top of the vehicle. The top view image is created by photographing the surrounding of the vehicle using one or more cameras provided in the vehicle and combining photographed images. The top view image output unit 100 may be an around view monitoring (AVM) system. The vehicle may include a camera provided in at least one of a front side, a rear side, and left and right sides. The top view image output unit 100 outputs a top view image obtained by photographing the surrounding of the vehicle using cameras provided at front, rear, and sides of the vehicle and combining photographed vehicle surrounding images into one image.

When a top hat filter is applied, known as a top hat transformation, it may be used to detect a portion of a gray scale image in which brightness is changed. For example, when a bright part is present in a dark part in the grayscale image, if the top hat filter is applied, a point where the dark part and the bright part meet is detected. This is because the brightness is most sharply changed at the point where the dark part and the bright part meet. When the lane boundary is detected, in the grayscale image, a lane is a dark part and the other ground part is dark. When the top hat filter is applied to the grayscale image, a boundary part of the lane is detected. A process of calculating a feature point using the top hat filter by the lane detecting unit 200 will be described with reference to FIG. 2.

The lane detecting unit 200 applies the top hat filter to the grayscale image of the top view image in a horizontal direction and detects a maximum value of a brightness variation and considers the portion where the maximum value is detected as a left feature point and a right feature point of the lane.

The lane detecting unit 200 considers a center portion between the left feature point and the right feature point of the lane as a vehicle lane center point.

The lane detecting unit 200 searches all directions based on the left feature point and the right feature point to detect a portion which is detected as a lane. A process of detecting the portion which is detected as a lane from the calculated feature point by the lane detecting unit 200 will be described below with reference to FIG. 3.

The lane detecting unit 200 compares an error of an angle formed by the portion which is detected as a lane and when the error of the angle is equal to or smaller than a predetermined value, admits effectiveness of the line component and represents the line component as a lane candidate group based on the center point of the lane.

The lane detecting unit 200 may determine whether an interval between a detected left lane boundary of the vehicle and a detected right lane boundary of the vehicle has a set interval value to determine effectiveness of the lane. A process of determining whether the interval between the detected left lane boundary and the detected right lane boundary has a set interval value Vd by the lane detecting unit 200 will be described below with reference to FIG. 4.

Figure 2:
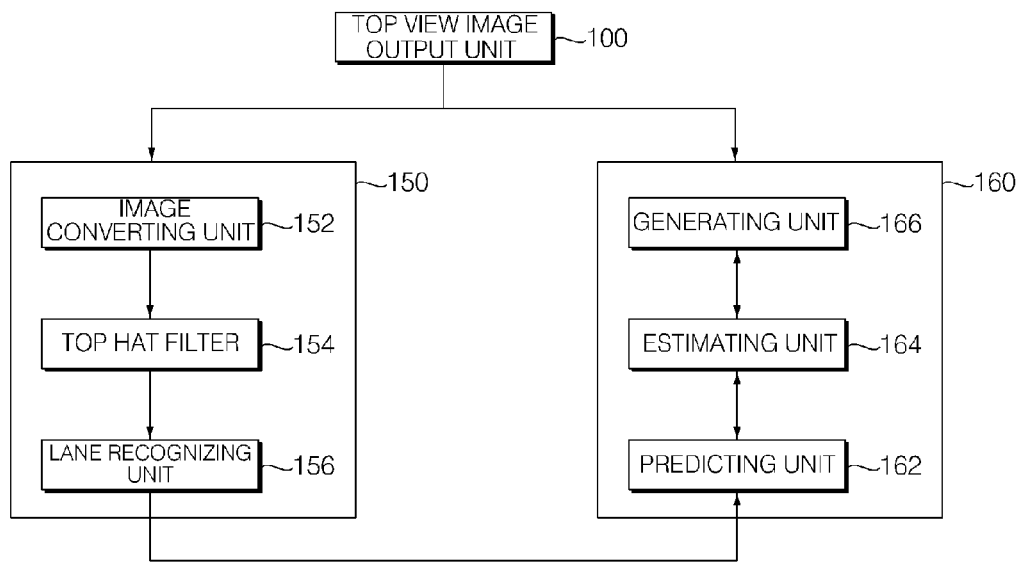
FIG. 2 is a block diagram illustrating a control configuration of a top view image output unit and a lane detecting unit of a driver assisting apparatus according to an exemplary embodiment.

As illustrated in FIG. 2, the lane detecting unit 200 may include a recognizing unit 150 and a control unit 160 and the top view image output unit 100 inputs a top view image to the lane detecting unit 200.

That is, the lane detecting unit 200 applies the top hat filter to the grayscale image of the top view image in a horizontal direction, detects a maximum value of the brightness variation, considers the portion where the maximum value is detected as a left feature point and a right feature point of the lane, considers a center portion of the left feature point and the right feature point of the lane as a center point of the lane, searches all directions based on the left feature point and the right feature point to detect a portion which is detected as a lane, compares an error of an angle formed by the portion which is detected as a lane and when the error of the angle is equal to or smaller than a predetermined value, admits effectiveness of the line component and represents the line component as a lane candidate group based on the center point of the lane.

The top view image output unit 100 may include a plurality of cameras which photographs the surrounding images including front and rear images and left and right images of the vehicle.

The lane detecting unit 200 may include the recognizing unit 150 that recognizes a parking section guide line and left and right parking lines from the top view image and the control unit 160 that predicts a gradient direction of a parking line which is perpendicular to the parking section guide line and a first gradient of the left and right parking lines, estimates a second gradient of the left and right parking lines based on the first gradient and a position coordinate of the vehicle to generate left and right parking guide lines corresponding to the left and right parking lines when a difference value between the first and second gradients is smaller than a predetermined threshold difference value to generate a composite image in which the left and right parking guide lines overlap the top view image.

The recognizing unit 150 may include an image converting unit 152 that converts the top view image into a grayscale image, a top hat filter unit 154 that extracts a plurality of guide line feature points and a plurality of parking line feature points using an illumination variation of the grayscale image, and a lane recognizing unit 156 that extracts line components of the plurality of guide line feature points and the plurality of parking line feature points to recognize the parking section guide lines and the left and right parking lines.

Figure 7:
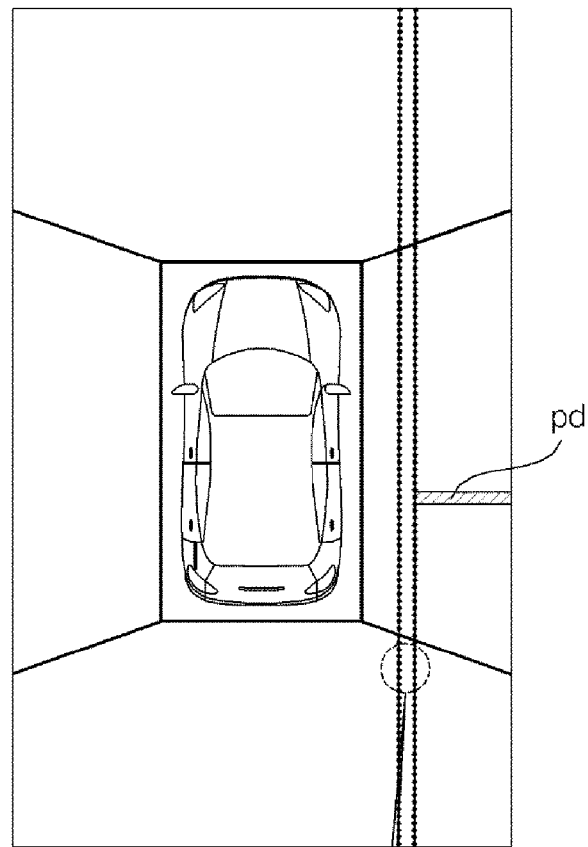
FIG. 7 is a view illustrating a lane detecting unit of a driver assisting apparatus according to an exemplary embodiment recognizing a parking section guide line.
Figure 7:
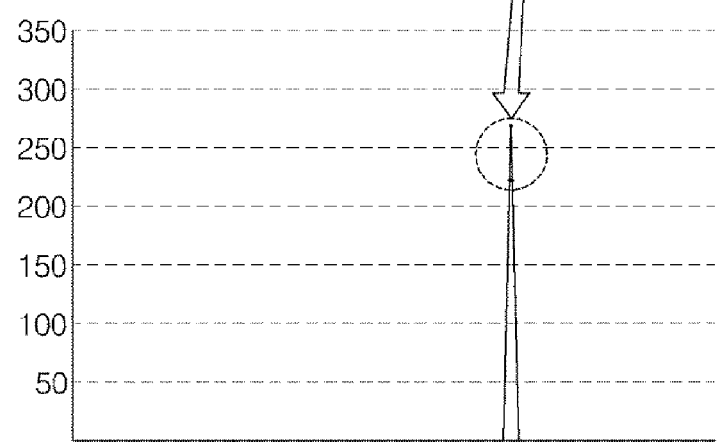

As illustrated in FIG. 7, the top hat filter unit 154 shows a value obtained by measuring the illumination variation with respect to the parking section guide line horizontally located in a target parking section.

In this case, the top hat filter unit 154 measures a value in the form of a triangle along a width of the parking section guide line and extracts a center value of the triangular shape as the plurality of guide line feature points.

Figure 8:
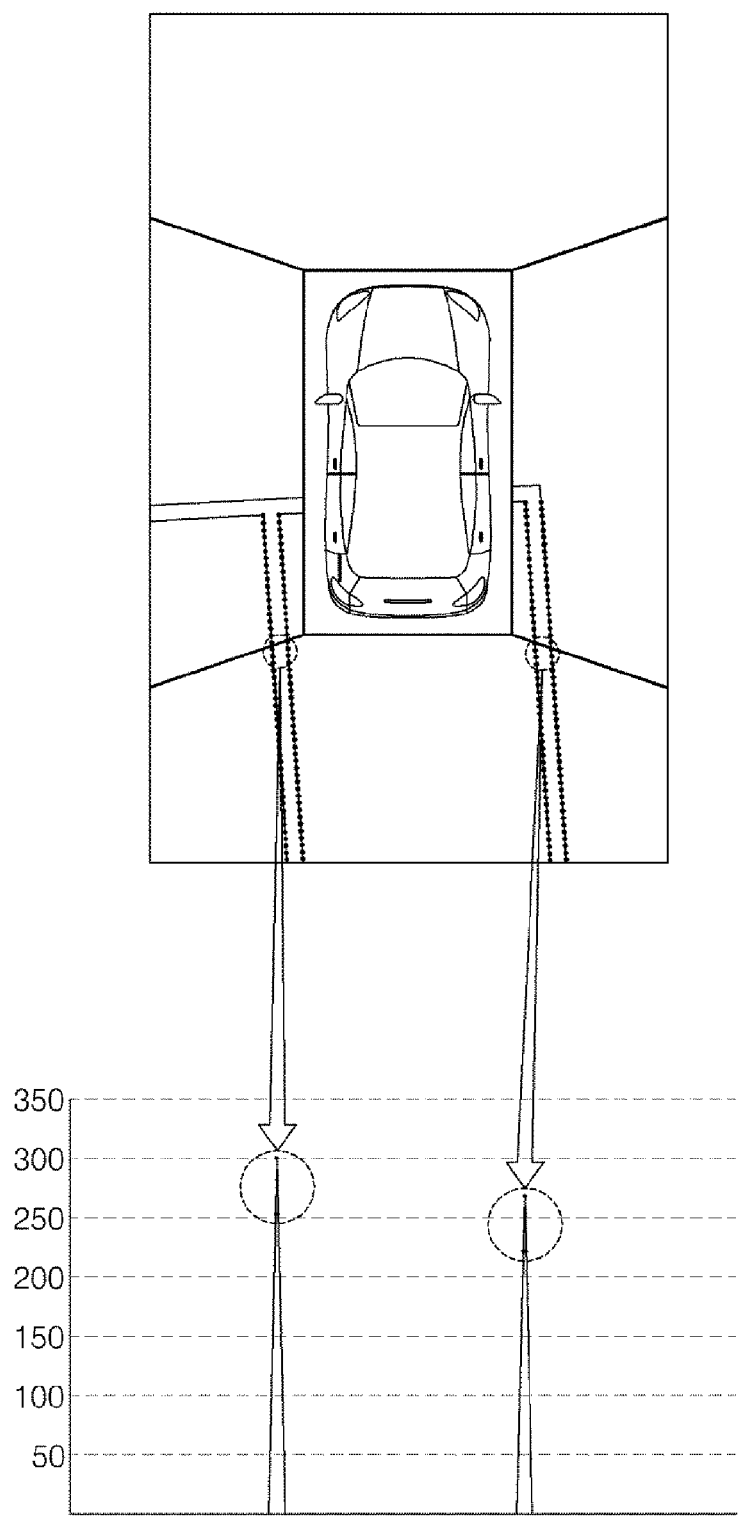
FIG. 8 is a view illustrating a lane detecting unit of a driver assisting apparatus according to an exemplary embodiment recognizing a parking line.
Figure 9:
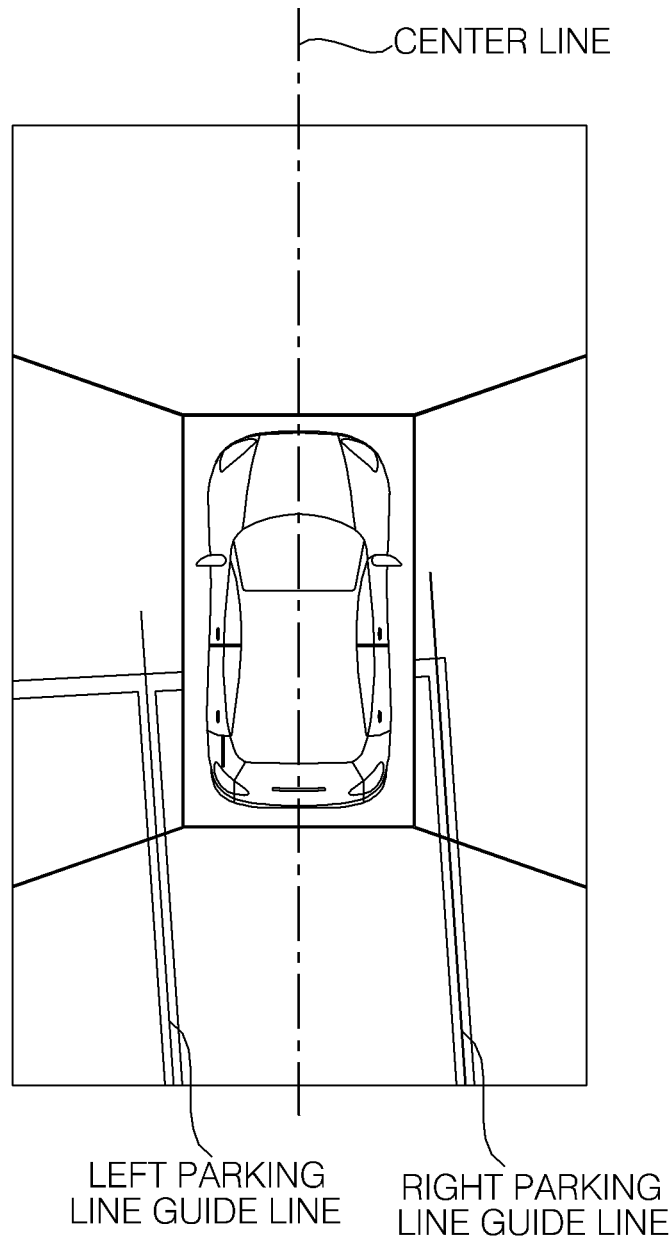
FIG. 9 is a view illustrating an image in which left and right parking lines overlap left and right parking guide lines in a driver assisting apparatus according to an exemplary embodiment.

As illustrated in FIG. 8, the top hat filter unit 154, similarly as described above, shows a value obtained by measuring the illumination variation with respect to the left and right parking lines which are vertically located in the target parking section.

The control unit 160 may include a predicting unit 162, an estimating unit 164, and a generating unit 166.

Specifically, the control unit 160 may include the predicting unit 162 that predicts a gradient direction of the parking line which is perpendicular to the parking section guide line and a first gradient of the left and right parking lines, the estimating unit 164 that estimates a second gradient of the left and right parking lines based on the first gradient and the position coordinate of the vehicle, and the generating unit 166 that generates the composite image when the difference value between the first and second gradients is smaller than a predetermined threshold difference value.

The predicting unit 162 may predict the first gradient based on a coordinate of the image of the left and right parking lines and the position coordinate of the vehicle.

The threshold difference value may be about 1° to about 11°.

The driver assisting apparatus according to the exemplary embodiment may further include a parking assisting unit 500 that detects a parking space based on the lane detected by the lane detecting unit and parks the vehicle in the parking space when the parking space is detected and in this case, the integrated control unit 400 operates the parking assisting unit 500 when the speed is equal to or lower than a first threshold value.

For example, when the speed of the vehicle is equal to or smaller than 20 kph (kilometer per hour), the parking assisting unit 500 may perform the parking assistance. The parking assisting unit 500 may be a smart parking assist system (SPAS). When the parking assisting unit 500 performs the parking assistance, the interval between the left lane boundary and the right lane boundary of the vehicle which is output by the lane detecting unit 200 is considered. When the interval between the left lane boundary and the right lane boundary of the vehicle is smaller than the width of the vehicle, the parking assisting unit 500 may re-research another parking space to park the vehicle.

Figure 3:
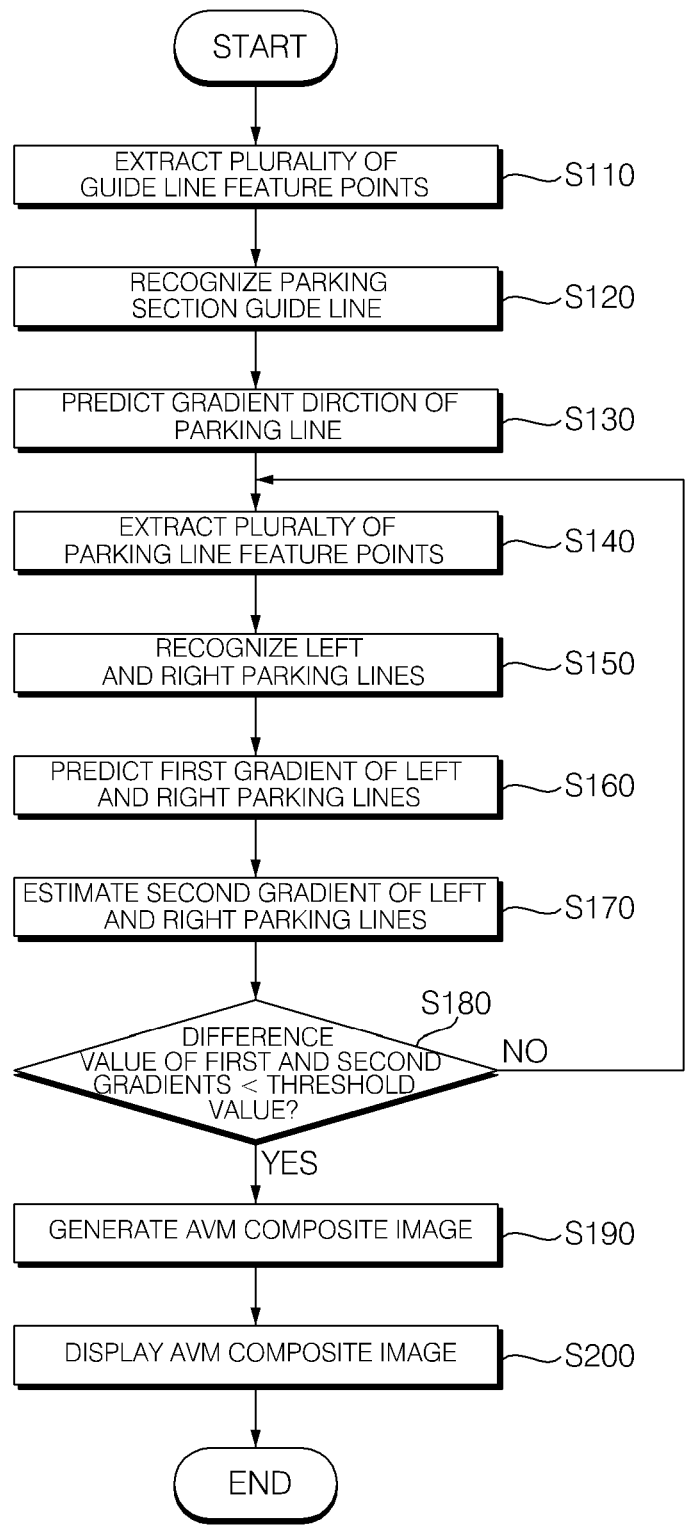
FIG. 3 is a flowchart illustrating a process of detecting a parking space by a driver assisting apparatus according to an exemplary embodiment.

FIG. 3 is a flowchart illustrating a process of detecting a parking space by a driver assisting apparatus according to an exemplary embodiment.

Referring to FIG. 3, the driver assisting apparatus extracts a plurality of guide line feature points from a first grayscale image which is converted from a first top view image photographed at a first point of time using an illumination variation in a horizontal direction in step S110, extracts a line component for the plurality of guide line feature points to recognize the parking section guide line in step S120, and predicts a gradient direction of the parking line which is perpendicular to the parking section guide line in step S130.

Thereafter, the driver assisting apparatus extracts a plurality of parking line feature points using a vertical illumination variation from a second grayscale image which is converted from the second top view image photographed at a second point of time which is later than the first point of time in step S140, extracts a line component for the plurality of parking line feature points to recognize the left and right parking lines in step S150, and predicts the first gradient based on an image coordinate of the left and right parking lines and a position coordinate of the vehicle in step S160.

The driver assisting apparatus may estimate the second gradient based on the first gradient and the position coordinate of the vehicle in step S170.

The driver assisting apparatus determines whether a difference value between the first and second gradients is smaller than a predetermined threshold difference value in step S180 and generates the top view composite image in which the left and right parking guide lines generated based on any one of the first and second gradients overlap the left and right parking lines when the difference value is smaller than the threshold difference value in step S190.

Next, the driver assisting apparatus may display the top view composite image in step S200.

The driver assisting apparatus according to the exemplary embodiment may further include a driver warning unit 600 that issues a warning to the driver when the vehicle leaves the lane while being driven and the integrated control unit 400 may operate the driver warning unit 600 when the speed is equal to or higher than a second threshold value.

The driver warning unit 600 detects movement of a steering wheel of the vehicle to determine whether there is movement to change a driving lane and issues a warning to the driver when the vehicle leaves the driving lane without being moved to change the parking lane.

For example, the driver warning unit 600 issues a lane departure warning when the speed of the driving vehicle exceeds 50 kph. The lane departure warning which is issued by the driver warning unit 600 may be a lane departure warning system (LDWS). The driver warning unit 600 recognizes the lane detected by the lane detecting unit 200 and issues a warning to the driver when the vehicle runs out of the detected lane without being controlled by the driver. The driver warning unit 600 receives a signal for steering wheel manipulation through a controller area network (CAN) to determine whether the lane departure of the vehicle is intended by the driver.

Figure 5:
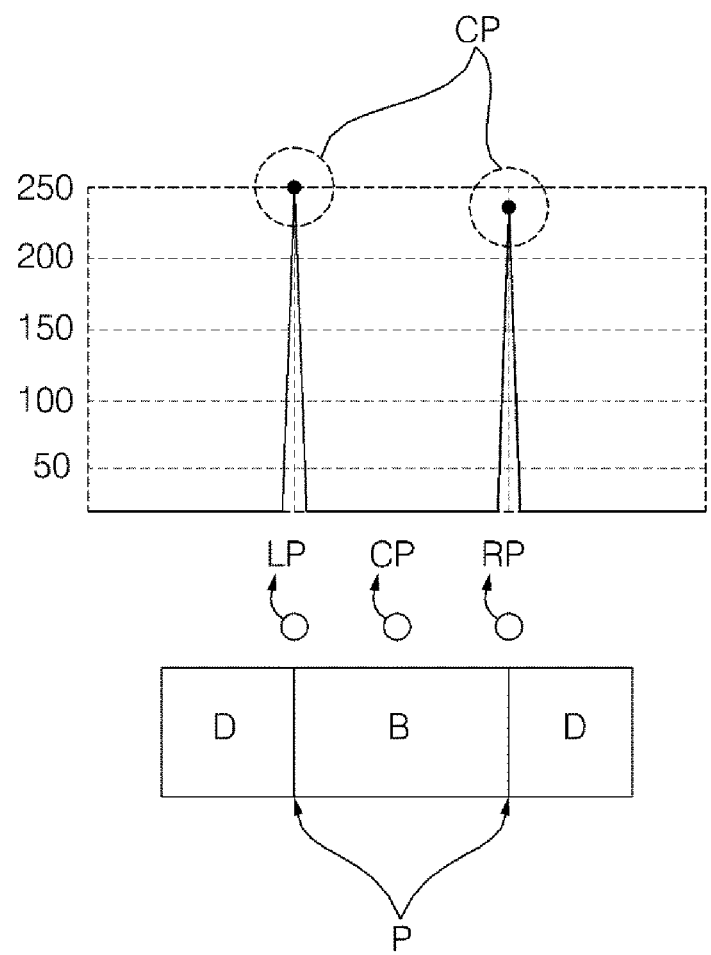
FIG. 5 is a view illustrating a lane detecting unit of a driver assisting apparatus according to an exemplary embodiment calculating a feature point using a top hat filter.

FIG. 5 is a view illustrating that the lane detecting unit 200 calculates a feature point using a top hat filter. The lane detecting unit 200 converts the top view image into a grayscale image. The lane detecting unit 200 applies the top hat filter to the grayscale image in a horizontal direction. The lane detecting unit 200 detects a maximum value in a local area to detect a center point CP of the lane. The lane detecting unit 200 detects the maximum value in the local area with respect to a boundary between a left side of the lane and a right side of the lane based on the center point to calculate a lane left feature point LP and a lane right feature point RP. The lane left feature point LP and the lane right feature point RP which are calculated by the lane detecting unit 200 are located between a dark part D and a bright part B.

Figure 6:
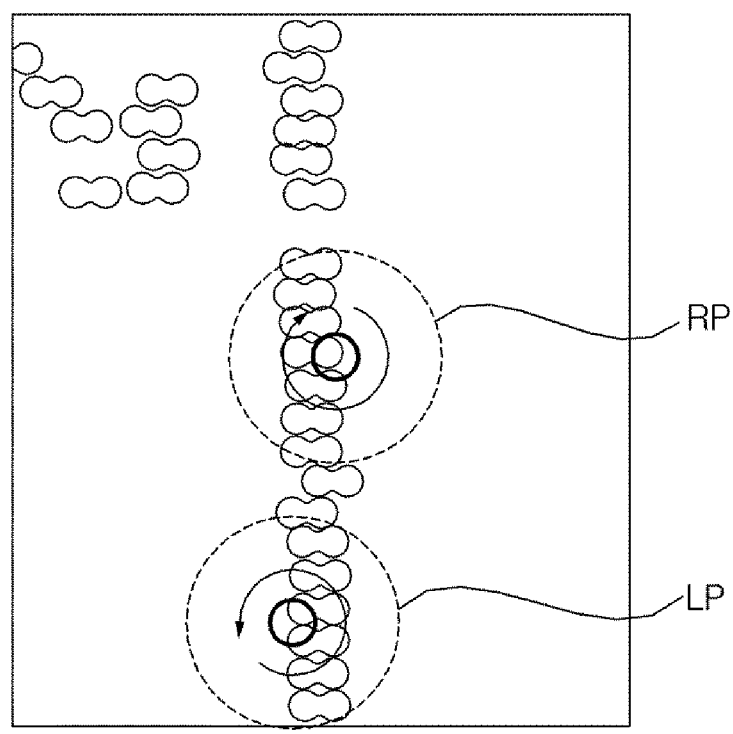
FIG. 6 is a view illustrating a lane detecting unit of a driver assisting apparatus according to an exemplary embodiment extracting a line component from the calculated feature point.

FIG. 6 is a view illustrating that a line component is extracted from the feature point detected by the lane detecting unit 200. The lane detecting unit 200 searches entire radiating directions based on the lane left feature point LP and the lane right feature point RP to extract a line component. The lane detecting unit 200 may search a 360 degree direction with respect to the lane left feature point and the lane right feature point to extract a line component. According to an exemplary embodiment, the lane detecting unit 200 may search a clockwise direction with respect to the lane right feature point RP in FIG. 3 or search the lane left feature point LP and a counterclockwise direction with respect to the lane left feature point LP. The lane detecting unit 200 may search a counterclockwise direction with respect to the lane right feature point RP or search a clockwise direction with respect to the lane left feature point LP.

The lane detecting unit 200 checks effectiveness of the line component by comparing an angle error of the extracted line component. The angle error which is considered by the lane detecting unit 200 according to an exemplary embodiment is a set value and may be set within 5 degrees. When the effectiveness of the line component is satisfied, the lane detecting unit 200 stores a lane candidate group with respect to the center point CP of the lane.

Figure 10:
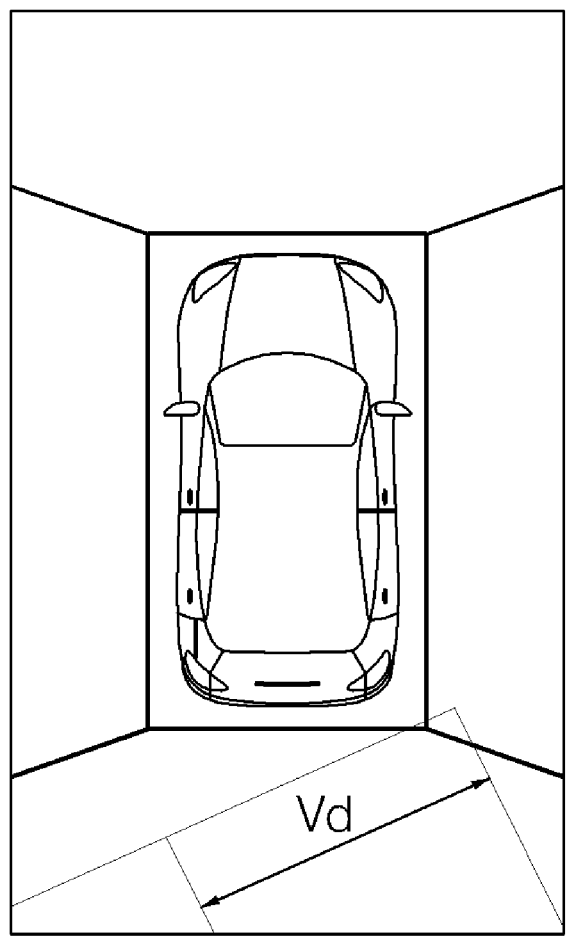
FIG. 10 is an exemplary view for determining effectiveness of a lane in consideration of an interval of lane boundaries detected by a lane detecting unit of a driver assisting apparatus according to an exemplary embodiment.

FIG. 10 is a view illustrating that the lane detecting unit 200 determines effectiveness of the lane by considering an interval of detected lane boundaries. The lane detecting unit 200 determines the effectiveness of the lane in at least one of a parking situation and a road driving situation. The lane detecting unit 200 determines whether the detected interval of the left and right lane boundaries of the vehicle has a set interval value Vd to determine the effectiveness of the lane. The interval value Vd which is set in the lane detecting unit 200 may be stored in the lane detecting unit 200. The interval value Vd of the parking line may be set in the lane detecting unit 200 in real time by receiving geographical information through wireless communication. The lane detecting unit 200 may determine effectiveness of the lane in continuous top view images.

Figure 4:
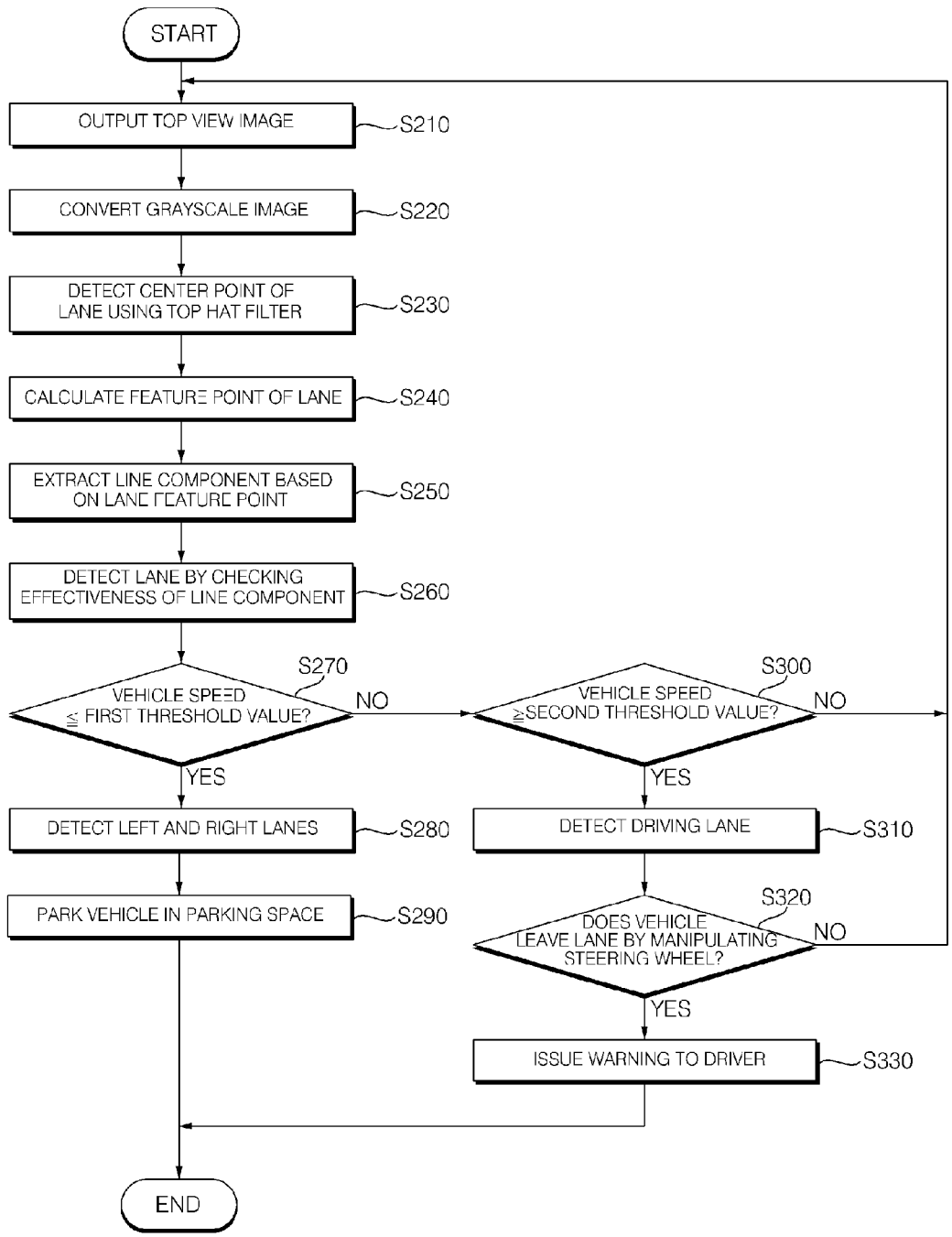
FIG. 4 is a flowchart illustrating a driver assisting method according to an exemplary embodiment.

FIG. 4 is a flowchart illustrating a driver assisting method according to an exemplary embodiment.

Specifically, a driver assisting method according to an exemplary embodiment may include an image output step of composing images at a surrounding of the vehicle to output a top view image, an image converting step of converting the top view image into a grayscale image, a lane detecting step of detecting a left lane boundary and a right lane boundary of the vehicle from the grayscale image using a top hat filter, an effectiveness determining step of detecting an interval between the left lane boundary and the right lane boundary to determine effectiveness of the detected lane, a speed measuring step of measuring a speed of the vehicle, and a function operating step of selecting and operating one of a parking assisting function and a lane departure warning function in accordance with the speed.

In the lane detecting step, a maximum value of a brightness variation in an area where a top hat filter is applied to the grayscale image is detected and the portion where the maximum value is detected is considered as a left feature point and a right feature point of the lane to detect a left lane boundary of the vehicle and a right lane boundary of the vehicle.

In the lane detecting step, a center part of the left feature point and the right feature point of the lane is considered as a center point of the lane to detect the left lane boundary and the right lane boundary of the vehicle.

In the lane detecting step, all directions are searched based on the left feature point and the right feature point and a portion which is detected as a lane is detected to detect the left lane boundary and the right lane boundary of the vehicle.

In the lane detecting step, an error of an angle formed by the portion which is detected as a lane is compared and when the error of the angle is equal to or smaller than a predetermined value, effectiveness of the line component is determined and the line component is represented as a lane candidate group based on the center point of the lane to detect the left lane boundary and the right lane boundary of the vehicle.

In the lane detecting step, a parking space is detected based on the detected lane and in the function operating step, when the speed is equal to or smaller than a first threshold value, the parking assisting function may be operated.

In the lane detecting step, a maximum value of the brightness variation is detected in an area where the top hat filter is applied to the grayscale image to consider the portion where the maximum value is detected as a left feature point and a right feature point of the lane and consider a center portion of the left feature point and the right feature point of the lane as a center point of the lane, all directions based on the left feature point and the right feature point are searched to detect a portion which is detected as a lane, an error of an angle formed by the portion which is detected as a lane is compared and when the error of the angle is equal to or smaller than a predetermined value, effectiveness of the line component is determined and the line component is represented as a lane candidate group based on the center point of the lane, thereby detecting the left lane boundary of the vehicle and the right lane boundary of the vehicle.

The lane detecting step may go through a step of recognizing a parking section guide line in a first top view image photographed at a first point of time, a step of predicting a first gradient of left and right parking lines in a second top view image photographed at a second point of time after the first point of time, and estimating a second gradient of the left and right parking lines based on position information of the vehicle, a step of determining whether a difference value between the first and second gradients is smaller than a set threshold difference value, and a step of generating a top view composite image including left and right parking guide lines corresponding to the left and right parking lines when the difference value is smaller than the threshold difference value, to detect the parking space.

The gradient predicting and estimating step may include a step of predicting the first gradient and a step of estimating the second gradient.

The step of predicting the first gradient includes a step of extracting a plurality of parking line feature points using a vertical illumination variation from a second grayscale image which is converted from the second top view image, a step of extracting a line component for the plurality of parking line feature points to recognize the left and right parking lines, and a step of predicting the first gradient based on an image coordinate of the left and right parking lines and a position coordinate of the vehicle.

In the step of estimating a second gradient, the second gradient may be estimated based on the first gradient which is predicted in the step of predicting the first gradient and the position coordinate of the vehicle.

The threshold difference value may be about 1° to about 11°.

In the step of generating a tip view composite image, the top view composite image in which the left and right parking guide lines generated based on any one of the first and second gradients overlap the left and right parking lines is generated.

The driver assisting method according to the exemplary embodiment may further include a step of displaying the top view composite image.

The parking assisting function may be a function of automatically parking the vehicle in the detected parking space.

In the function operating step, when the speed is equal to or higher than a second threshold value, the lane departure warning function may be operated.

According to the lane departure warning function, movement of a steering wheel of the vehicle is detected to determine whether there is movement to change a driving lane and a warning is issued to the driver when the vehicle leaves the driving lane without being moved to change the driving lane.

The driver assisting method according to the exemplary embodiment may further include a step of detecting a lane after changing the lane when the vehicle leaves a driving lane in accordance with movement to change the driving lane.

The driver assisting method according to the exemplary embodiment may further include a step of displaying the lane detected in the lane detecting step by a lane with a set color to output the lane. Therefore, the driver may check whether the lane is recognized in real time.

Although not illustrated, a controller may be utilized to control various aspects of the driver assistant apparatus of the exemplary embodiments. For instance, the controller may be configured to control the top view image output unit 100, lane detecting unit 200, speed measuring unit 300, integrated control unit 400, parking assisting unit 500, and driver warning unit 600. Alternatively, any component described may have a separate internal controller (e.g., the driver 320 may have a controller that controls the modulator 316) or shared controllers (e.g., the integrated control unit 400, parking assisting unit 500 and driver warning unit 600 share a controller). As such, the various components of the driver assistant apparatus (including the controller) may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, etc.

According to one or more exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, the driver assistant apparatus may include or otherwise be associated with one or more memories (not shown) including code (e.g., instructions) configured to cause one or more components of the driver assistant apparatus to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire, and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A driver assisting apparatus, comprising:
a top view image output unit that outputs a top view image at a view point at which a surrounding of a vehicle is downwardly watched from a top;
a lane detecting unit that detects a left lane boundary of the vehicle and a right lane boundary of the vehicle from the top view image using a top hat filter;
a speed measuring unit that outputs a speed of the vehicle; and
an integrated control unit that selects and operates one of a parking assisting function and a lane departure warning function in accordance with the speed and in accordance with the left lane boundary of the vehicle and the right lane boundary of the vehicle,
wherein the lane detecting unit applies the top hat filter to a grayscale image of the top view image in a horizontal direction and detects a maximum value of a brightness variation on each of a left side and a right side of the grayscale image and considers a portion on each of a left portion and a right portion of the grayscale image where the maximum values are detected as a left feature point and a right feature point of a lane, considers a center portion of the left feature point and the right feature point of the lane as a vehicle center point, searches all directions based on the left feature point and the right feature point to detect a portion which is detected as the lane, and determines an error of an angle formed by the left side and the right side of the lane, and determines a line component as a lane boundary and represents the line component as the lane boundary candidate group based on a center point of the lane when the error of the angle is equal to or smaller than a predetermined value.

2. The apparatus of claim 1, wherein the top view image output unit comprises a plurality of cameras that photographs a surrounding image comprising front and rear images and left and right images of the vehicle.

3. The apparatus of claim 1, wherein the lane detecting unit comprises:
a recognizing unit that recognizes a parking section guide line and left and right parking lines from the top view image; and
a control unit that predicts a gradient direction of a parking line which is perpendicular to the parking section guide line and a first gradient of the left and right parking lines, estimates a second gradient of the left and right parking lines based on the first gradient and a position coordinate of the vehicle to generate left and right parking guide lines corresponding to the left and right parking lines when a difference value between the first and second gradients is smaller than a predetermined threshold difference value to generate a composite image in which the left and right parking guide lines overlap the top view image.

4. The apparatus of claim 3, wherein the recognizing unit comprises:
an image converting unit that converts the top view image into a grayscale image, a top hat filter unit that extracts a plurality of guide line feature points and a plurality of parking line feature points using an illumination variation of the grayscale image; and
a lane recognizing unit that extracts line components of the plurality of guide line feature points and the plurality of parking line feature points to recognize the parking section guide lines and the left and right parking lines, and the control unit comprises:
a predicting unit that predicts the gradient direction of the parking line that is perpendicular to the parking section guide line and the first gradient of the left and right parking lines;
an estimating unit that estimates a second gradient of the left and right parking lines based on the first gradient and the position coordinate of the vehicle; and
a generating unit that generates the composite image when the difference value between the first and second gradients is smaller than a predetermined threshold difference value.

5. The apparatus of claim 1, wherein the lane detecting unit determines whether an interval between a detected left lane of the vehicle and a detected right lane of the vehicle has a set interval value to determine effectiveness of a lane component.

6. The apparatus of claim 1, further comprising:
a parking assisting unit that detects a parking space based on the lane detected by the lane detecting unit and parks the vehicle in the parking space when the parking space is detected,
wherein the integrated control unit operates the parking assisting unit when the speed is equal to or lower than a first threshold value.

7. The apparatus of claim 1, further comprising:
a driver warning unit that issues a warning to a driver when a vehicle leaves a lane while being driven,
wherein the integrated control unit operates the driver warning unit when the speed is equal to or higher than a second threshold value.

8. The apparatus of claim 7, wherein the driver warning unit detects movement of a steering wheel of the vehicle to determine whether there is a movement to change a driving lane and issues a warning to the driver when the vehicle leaves the driving lane without being moved to change the driving lane.

9. A driver assisting method, comprising: capturing images at a surrounding of a vehicle to output a top view image; converting the top view image into a grayscale image; detecting a left lane and a right lane of the vehicle from the grayscale image using a top hat filter; detecting an interval between a boundary of the left lane and a boundary of the right lane to determine an effectiveness of a lane component; measuring a speed of the vehicle; and selecting and operating one of a parking assisting function and a lane departure warning function in accordance with the measured speed and in accordance with the left lane boundary of the vehicle and the right lane boundary of the vehicle,
wherein in detecting the left lane and the right lane further comprises applying the top hat filter to the grayscale image to detect a maximum value of a brightness variation on each of a left side and a right side of the grayscale image, considering a portion on each of a left side and a right side of the grayscale image where the maximum values are detected as a left feature point and a right feature point of a lane, considering a center portion of the left feature point and the right feature point of the lane as a vehicle center point, searching all directions based on the left feature point and the right feature point to detect a portion which is detected as the lane, and determining an error of an angle formed by the left side and the right side of the lane and, determining a line component as a lane boundary and represents the line component as the lane boundary candidate group based on a center point of the lane when the error of the angle is equal to or smaller than a predetermined value.

10. The method of claim 9, wherein in detecting the boundary of the left lane and the boundary of the right lane, a parking space is detected based on the detected lane, and when the speed is equal to or lower than a first threshold value, the parking assisting function is operated.

11. The method of claim 10, wherein detecting the left lane and the right lane further comprises recognizing a parking section guide line in a first top view image photographed at a first point of time, predicting a first gradient of left and right parking lines in a second top view image photographed at a second point of time after the first point of time, and estimating a second gradient of the left and right parking lines based on position information of the vehicle, determining whether a difference value between the first and second gradients is smaller than a set threshold difference value, and generating a top view composite image including left and right parking guide lines corresponding to the left and right parking lines when the difference value is smaller than the threshold difference value, to detect the parking space.

12. The method of claim 11, wherein predicting the first gradient comprises extracting a plurality of parking line feature points using a vertical illumination variation from a second grayscale image which is converted from the second top view image, extracting a line component for the plurality of parking line feature points to recognize left and right parking lines, and predicting the first gradient based on an image coordinate of the left and right parking lines and a position coordinate of the vehicle, and in estimating a second gradient, the second gradient is estimated based on the first gradient which is predicted in predicting the first gradient and the position coordinate of the vehicle.

13. The method of claim 11, wherein the threshold difference value is about 1° to about 11°, in generating a tip view composite image, the top view composite image in which the left and right parking guide lines generated based on one of the first and second gradients overlap the left and right parking lines is generated, and displaying the top view composite image is further included.

14. The method of claim 10, wherein the parking assisting function automatically parks the vehicle in the detected parking space.

15. The method of claim 9, wherein when the speed is equal to or higher than a second threshold value, the lane departure warning function is operated.

16. The method of claim 15, wherein selecting and operating the lane departure warning function further comprises detecting movement of a steering wheel of the vehicle to determine whether there is movement to change a driving lane and issuing a warning to a driver when the vehicle leaves the driving lane without a movement of the steering wheel.

17. The method of claim 16, further comprising:
detecting a lane after changing the lane when the vehicle leaves the driving lane in accordance with movement to change the driving lane.

18. The method of claim 9, wherein detecting the left lane and the right lane further comprises displaying the detected lane by a lane with a set color to output the lane.

* * * * *